United States Patent
Sivik

(10) Patent No.: US 6,365,785 B1
(45) Date of Patent: Apr. 2, 2002

(54) PROCESS FOR PREPARING ETHER-CAPPED POLY(OXYALKYLATED) ALCOHOL SURFACTANTS

(75) Inventor: Mark Robert Sivik, Fairfield, OH (US)

(73) Assignee: TherProcter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/485,137
(22) PCT Filed: Jul. 31, 1998
(86) PCT No.: PCT/US98/16034
§ 371 Date: Feb. 2, 2000
§ 102(e) Date: Feb. 2, 2000
(87) PCT Pub. No.: WO99/06468
PCT Pub. Date: Feb. 11, 1999

Related U.S. Application Data
(60) Provisional application No. 60/054,702, filed on Aug. 2, 1997.

(51) Int. Cl.[7] .............................................. C07C 43/11
(52) U.S. Cl. ........................ 568/625; 568/616; 568/618; 568/622
(58) Field of Search ................................. 568/625, 622, 568/618, 616

(56) References Cited

U.S. PATENT DOCUMENTS

| | | | | |
|---|---|---|---|---|
| 4,375,565 A | * | 3/1983 | Greif et al. | 568/622 |
| 4,898,621 A | * | 2/1990 | Pruehs et al. | 134/25.2 |
| 4,913,833 A | * | 4/1990 | Otten et al. | 252/99 |
| 4,925,587 A | * | 5/1990 | Schenker et al. | 252/174.22 |
| 5,294,365 A | * | 3/1994 | Welch et al. | 252/174.21 |

FOREIGN PATENT DOCUMENTS

| DE | 22 25 318 | * | 5/1972 |
|---|---|---|---|
| WO | WO97/22651 | * | 6/1997 |

* cited by examiner

Primary Examiner—Samuel Barts
Assistant Examiner—Eluis O. Price
(74) Attorney, Agent, or Firm—Kim W. Zerby; C. Brant Cook; Richard S. Echler Sr.

(57) ABSTRACT

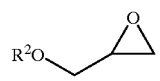

(I)

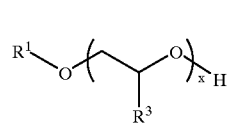

(II)

A process for preparing an ether-capped poly(oxyalky lated)alcohol surfactant is provided. The alcohol has the formula:

$$R^1O[CH_2CH(R^3)O]_kCH_2CH(OH)CH_2OR^2$$

wherein $R^1$ and $R^2$ are linear or branched, saturated or unsaturated, aliphatic or aromatic hydrocarbon radicals having from 1 to 30 carbon atoms; $R^3$ is H, or a linear aliphatic hydrocarbon radical having from 1 to 4 carbon atoms; x is an integer having an average value from 6 to 15, wherein when x is 2 or greater $R^3$ may be the same or different; further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof; comprising the steps of: (a) providing a glycidyl ether having formula (I) wherein $R^2$ is defined as above; (b) providing an ethoxylated alcohol having formula (II) wherein $R^1$, $R^3$ and x are defined as above; and (c) reacting the glycidyl ether with the ethoxylated alcohol to form the surfactant.

20 Claims, No Drawings

PROCESS FOR PREPARING ETHER-CAPPED POLY(OXYALKYLATED) ALCOHOL SURFACTANTS

This Application claims benefit of Provisional Application Ser. No. 60/054,702 filed Aug. 2, 1997.

TECHNICAL FIELD

The present invention relates to a process for preparing low-foaming nonionic surfactants and more particularly to a process for preparing ether-capped poly(oxyalkylated) alcohol surfactants which have superior spotting and filming benefits in dishwashing and hard surface cleaning applications, as well as suds suppression in detergent compositions.

BACKGROUND OF THE INVENTION

Dishwashing and hard surface cleaning, in particular automatic dishwashing in domestic appliances, is an art very different from fabric laundering. Domestic fabric laundering is normally done in purpose-built machines having a tumbling action. These are very different from spray-action domestic automatic dishwashing appliances. The spray action in the latter tends to cause foam. Foam can easily overflow the low sills of domestic dishwashers and slow down the spray action, which in turn reduces the cleaning action. Thus in the distinct field of domestic machine dishwashing, the use of common foam-producing laundry detergent surfactants is normally restricted. These aspects are but a brief illustration of the unique formulation constraints in the domestic dishwashing and hard surface cleaning fields.

One solution to this foaming problem has been to include a suds suppressor, typically a silicone suds suppressor. However, this solution while it works to a certain extent in fabric laundering compositions, fails in domestic dishwashers. The high shear forces involved in domestic dishwashers breaks down the silicone suds suppressors, so any suds suppressors present at the start of the wash is gone before the end. The silicone suds suppressors are not robust enough to survive in the environment of a domestic dishwasher. Even in laundry applications, while less shear than that in a domestic dishwasher, there is still a drop off in suds suppression towards the end of the washing cycle, because of the break down of the silicone suds suppressor. One alternative would be increase the amount of silicone suds suppressor present, however the cost of silicone suds suppressors and the fact that they have a tendency to redeposit on hydrophobic surfaces, such as plastic, makes this an undesirable solution. There remains today the need for a viable and cost effective alternative to silicone suds suppressor suitable for use in automatic dishwashers as well as laundry washing machines.

On account of the foregoing technical constraints as well as consumer needs and demands, these compositions are undergoing continual change and improvement. Moreover environmental factors such as the restriction of phosphate, the desirability of providing ever-better cleaning results with less product, providing less thermal energy, and less water to assist the washing process, have all driven the need for improved compositions.

However, many compositions heretofore proposed for cleaning dishware and hard surfaces have had aesthetic and technical disadvantages, not the least of which is undesirable spots and films on the cleaned surfaces. These undesirable spots and films may be caused by redeposition of soils and cleaning agents such as surfactants which have a low solubility in water. In addition, there continues to be a need for better cleaning, especially for reduction of spots and films and in some cases removal of greasy soils. This need is driven by consumer demand for improving performance from the cleaning compositions spotting and filming benefits and on hard to remove greasy soils.

Accordingly, the need remains for low-foaming surfactants which can deliver improved spotting and filming reduction benefits while providing greasy soil removal, as well as providing suds suppression which is robust enough to survive the washing environment in which it is deployed.

BACKGROUND ART

U.S. Pat. No. 4,272,394, issued Jun. 9, 1981, U.S. Pat. No. 5,294, 365, issued Mar. 15, 1994 U.S. Pat. No. 4,248,729, issued Feb. 3, 1981; U.S. Pat. No. 4,284,532, issued Aug. 18, 1981; U.S. Pat. No. 4,627,927, issued Dec. 9, 1986; U.S. Pat. No. 4,790,856, issued Dec. 13, 1988; U.S. Pat. No. 4,804, 492, issued Feb. 14, 1989; U.S. Pat. No. 4,770,815, issued Sep. 13, 1989; U.S. Pat. No. 5,035,814, issued Jul. 30, 1991; U.S. Pat. No. 5,047,165, issued Sep. 10, 1991; U.S. Pat. No. 5,419,853, issued May 30, 1995; U.S. Pat. No 5,294,365, issued Mar. 15, 1994; GB Application No. 2,144,763, published Mar. 13, 1985; GB Application No. 2,154,599, published Sep. 9, 1985; WO Application No. 9,296,150, published Apr. 16, 1992; WO 94/22800, published Oct. 13, 1994, WO 93/04153, published Mar. 4, 1993, WO 97/22651, published Jun. 26, 1997, EP Application No. 342,177, published Nov. 15, 1989 and "Glyceryl Bisether Sulfates. 1: Improved Synthesis" Brian D. Condon; Journal Of the American Chemical Society, Vol. 71, no. 7 (July 1994).

SUMMARY OF THE INVENTION

This need is met by the present invention wherein a process for preparing a low-foaming nonionic surfactant is provided. The low-foaming nonionic surfactant, either alone or in combination with other surfactants, provides improved spotting and filming performance as well as improved cleaning performance on greasy soils and suds or foam suppression in certain applications. While not wishing to be bound by theory, it is believed the alcohol surfactants of the present invention deliver superior spotting and filming benefits via improved sheeting action. As for improved cleaning performance on greasy soils, such benefits are shown when the alcohol surfactants of the present invention are employed in conjunction with a high cloud point nonionic surfactant as disclosed in detail herein. Lastly, the alcohol surfactants of the present invention may also act to reduce the suds or foaming associated with food soils or various other cleaning agents and allow the use of soluble surfactants, which are high sudsing, such as amine oxides.

In accordance with a first aspect of the present invention, a process for preparing an ether-capped poly(oxyalkylated) alcohol surfactant is provided. The alcohol has the formula:

wherein $R^1$ and $R^2$ are linear or branched, saturated or unsaturated, aliphatic or aromatic hydrocarbon radicals having from about 1 to about 30 carbon atoms; $R^3$ is H, or a linear aliphatic hydrocarbon radical having from about 1 to about 4 carbon atoms; x is an integer having an average value from 1 to about 30, wherein when x is 2 or greater, $R^3$ may be the same or different, independently H, or $C_1$ to $C_4$ in any given molecule, further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof. The process comprises the steps of:

(a) providing a glycidyl ether having the formula:

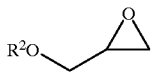

wherein $R^2$ is defined as above;

(b) providing an ethoxylated alcohol having the formula:

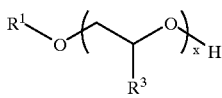

wherein $R^1$, $R^3$ and x are defined as above; and (c) reacting the glycidyl ether with the ethoxylated alcohol to form the surfactant.

$R^1$ and $R^2$ are preferably a linear or branched, saturated or unsaturated, aliphatic hydrocarbon radical having from about 6 to about 22 carbon atoms and x is an integer having an average value of from about 6 to about 15.

The step of reacting of glycidyl ether with ethoxylated alcohol may be conducted in the presence of a catalyst such as a mineral acid, Lewis acid or mixtures thereof. Preferably, the catalyst is a Lewis acid selected from the group consisting of $TiCl_4$, $Ti(O^iPr)_4$, $ZnCl_4$, $SnCl_4$, $AlCl_3$, $BF_3$—$OEt_2$ and mixtures thereof with $SnCl_4$ being the most preferred. The step of reacting the glycidyl ether with the ethoxylated alcohol is preferably conducted at a temperature of from about 50° C. to about 95° C. with 60° C. to about 80° C. even more preferred.

The step of providing the glycidyl ether may further comprises the step of reacting a linear aliphatic or aromatic alcohol having the formula $R^2OH$ and an epoxide having the formula:

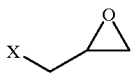

wherein $R^2$ is defined as above and X is a leaving group. This reaction may also be conducted in the presence of a catalyst as defined above. The catalyst is typically employed at levels about 0.1 mol % to about 2.0 mol % and is preferably conducted in the absence of a solvent at temperatures of from about 40° C. to about 90° C.

As already noted, the surfactants has advantages, including superior spotting and filming reduction benefits as well as excellent greasy soil removal, good dishcare, suds suppression and good overall cleaning.

Accordingly, it is an aspect of the present invention to provide a process for producing a low-foaming nonionic surfactant having superior spotting and filming reduction benefits as well as excellent greasy soil removal, good dishcare, suds suppression and good overall cleaning. It a further aspect of the present invention to provide a process for producing an ether-capped poly(oxyalkylated) alcohol surfactant. These and other aspects, features and advantages will be apparent from the following description and the appended claims.

All parts, percentages and ratios used herein are expressed as percent weight unless otherwise specified. All documents cited are, in relevant part, incorporated herein by reference.

DETAILED DESCRIPTION OF THE PREFERRED EMBODIMENTS

Once again, the present invention is directed toward a process for producing a low-foaming nonionic surfactant for use in detergent compositions.

The novel surfactants of the present invention comprise ether-capped poly(oxyalkylated) alcohols having the formula:

wherein $R^1$ and $R^2$ are linear or branched, saturated or unsaturated, aliphatic or aromatic hydrocarbon radicals having from about 1 to about 30 carbon atoms; $R^3$ is H, or a linear aliphatic hydrocarbon radical having from about 1 to about 4 carbon atoms; x is an integer having an average value from 1 to about 30, wherein when x is 2 or greater $R^3$ may be the same or different and k and j are integers having an average value of from about 1 to about 12, and more preferably 1 to about 5, further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof.

$R^1$ and $R^2$ are preferably linear or branched, saturated or unsaturated, aliphatic or aromatic hydrocarbon radicals having from about 6 to about 22 carbon atoms with about 8 to about 18 carbon atoms being most preferred. Additionally, $R^2$ may be selected from hydrocarbon radicals which are ethoxylated, propoxylated and/or butoxylated. H or a linear aliphatic hydrocarbon radical having from about 1 to about 2 carbon atoms is most preferred for $R^3$. Preferably, x is an integer having an average value of from about 1 to about 20, more preferably from about 6 to about 15.

As described above, when, in the preferred embodiments, and x is greater than 2, $R^3$ may be the same or different. That is, $R^3$ may vary between any of the alkyleneoxy units as described above. For instance, if x is 3, $R^3$ may be selected to form ethyleneoxy(EO) or propyleneoxy(PO) and may vary in order of (EO)(PO)(EO), (EO)(EO)(PO); (EO)(EO)(EO); (PO)(EO)(PO); (PO)(PO)(EO) and (PO)(PO)(PO). Of course, the integer three is chosen for example only and the variation may be much larger with a higher integer value for x and include, for example, multiple (EO) units and a much small number of (PO) units. However, when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl.

Particularly preferred surfactants as described above include those that have a low cloud point of less than about 20° C. These low cloud point surfactants may then be employed in conjunction with a high cloud point surfactant as described in detail below for superior grease cleaning benefits.

Most preferred according to the present invention are those surfactants wherein k is 1 and j is 1 so that the surfactants have the formula:

where $R^1$, $R^2$ and $R^3$ are defined as above and x is an integer with an average value of from about 1 to about 30, preferably from about 1 to about 20, and even more preferably from about 6 to about 18. Most preferred are surfactants wherein $R^1$ and $R^2$ range from about 9 to about 15, $R^3$ is H forming ethyleneoxy and x ranges from about 6 to about 15.

Basically, the alcohol surfactants of the present invention comprise three general components, namely a linear or branched alcohol, an alkylene oxide and an alkyl ether end cap. The alkyl ether end cap and the alcohol serve as a hydrophobic, oil-soluble portion of the molecule while the alkylene oxide group forms the hydrophilic, water-soluble portion of the molecule.

It has been surprisingly discovered in accordance with the present invention that significant improvements in spotting and filming characteristics and, when used in conjunction with high cloud point surfactants, in the removal of greasy soils relative to conventional surfactants, are provided via the ether-capped poly(oxyalkylene) alcohol surfactants of the present invention.

It has been surprisingly discovered that the ether-capped poly(oxyalkylene) alcohol surfactants of the present invention in addition to delivering superior cleaning benefits also provide good suds control. This suds control can be clearly seen in the presence of high sudsing surfactants, such as amine oxides, or in the presence of high sudsing soils, such as proteinaceous or egg soils.

Generally speaking, the ether-capped poly(oxyalkylene) alcohol surfactants of the present invention may be produced by reacting an aliphatic alcohol with an epoxide to form an ether which is then reacted with a base to form a second epoxide. The second epoxide is then reacted with an alkoxylated alcohol to form the novel compounds of the present invention.

The process comprises the first step of providing a glycidyl ether having the formula:

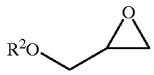

where $R^2$ is defined as above. Various glycidyl ethers are available from a number of commercial sources including the Aldrich Chemical Company. Alternatively, the glycidyl ether may be formed from the reaction of a linear or branched, aliphatic or aromatic alcohol of the formula $R^2OH$ where $R^2$ is defined as above and an epoxide of the formula:

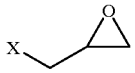

where X is a suitable leaving group. While a number of leaving groups may be employed in the present invention, X is preferably selected from the group consisting of halides including chloride, bromide, and iodide, tosylate, mesylate and brosylate, with chloride and bromide being even more preferred with chloride being the most preferred (e.g. epichlorohydrin).

The linear or branched alcohol and the epoxide are preferably reacted at ratios ranging from about 0.5 equivalents alcohol to 2.5 equivalents epoxide with 0.95 equivalents alcohol to 1.05 equivalents epoxide more typical under acidic conditions for catalysis purposes. Acids which may be employed as catalyst include mineral acids, including but not limited to $H_2SO_4$ and $H_3PO_4$ and Lewis acids including, but not limited to, $TiCl_4$, $Ti(O^iPr)_4$, $ZnCl_2$, $SnCl_4$, $AlCl_3$, and $BF_3$—$OEt_2$. Preferred catalysts include the Lewis acids with $SnCl_4$ and $BF_3$—$OEt_2$ being the most preferred. The catalysts are preferably employed at amounts of about 0.1 mol % to about 2.0 mol % with 0.2 mol % to about 1.0 mol % being more typical.

While the reaction may be conducted in the presence of a suitable solvent such as benzene, toluene, dichloromethane, tetrahydrofuran, diethylether, methyl tert-butylether or the like, the reaction is preferably conducted neat or in the absence of solvent. Lastly, the reaction is conducted at temperatures preferably ranging from about 40° C. to about 90° C., more preferably from about 50° C. to about 80° C.

Upon completion of the reaction, the mixture is treated with a basic material to form the glycidyl ether. The basic material is preferably a strong base such as a hydroxide. Preferred hydroxides include alkali metal hydroxides with sodium being the typical choice. However, one of ordinary skill in the art will recognize that other basic materials may also be employed. The basic material is preferably added at levels of from about 0.5 equivalents to about 2.5 equivalents, with 0.95 equivalents to 2.0 equivalents being more preferred.

The product glycidyl ether may then be collected after optional filtration, drying and distillation according to the methods well-known in the art. However there is no need to isolate/purify the product especially when symmetrical ethoxylated alcohol are to be formed.

To form the surfactant, an ethoxylated alcohol having the formula:

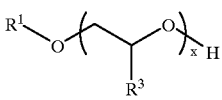

wherein $R^1$ and x are defined as before in an amount of from about 0.80 to about 2.0 equivalents is combined with a catalyst as described hereinbefore and heated to a temperature ranging from about 50° C. to about 95° C. and more preferably from about 60° C. to about 80° C. The glycidyl ether is then added to the mixture and reacted for from about 0.5 hours to about 30 hours, more preferably from about 1 hour to about 24 hours.

The ether-capped poly(oxyalkylated) alcohol surfactant product is then collect by means common in the art such as filtration. If desired, the surfactant may be further treated by stripping, distillation or various other means before use. The surfactants made the process disclosed herein may contain related impurities which will not adversely affect performance.

A representative synthetic route is demonstrated via the following diagram and examples.

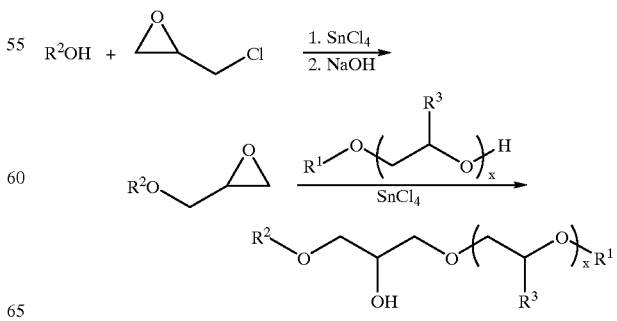

EXAMPLE 1
Preparation of $C_{12/13}$-alkyl Glycidyl Ether

Neodol® 23 (100.00 g, 0.515 mol, Shell Chemical Co.) and tin (IV) chloride (0.58 g, 2.23 mmol, available from Aldrich) are combined in a 500 mL three-necked, round-bottomed flask fitted with a condenser, argon inlet, addition funnel, magnetic stirrer and internal temperature probe. The mixture is heated to 60° C. Epichlorohydrin (47.70 g, 0.515 mol, available from Aldrich) is added dropwise so as to keep the temperature between 60–65° C. After stirring an additional hour at 60° C., the mixture is cooled to room temperature. The mixture is treated with a 50% solution of sodium hydroxide (61.80 g, 0.773 mol, 50%) while being stirred mechanically. After addition is completed, the mixture is heated to 90° C. for 1.5 h, cooled, and filtered with the aid of ethanol. The filtrate is separated and the organic phase is washed with water (100 mL), dried over $MgSO_4$, filtered, and concentrated. Distillation of the product mixture at 100–120° C. (0.1 mm Hg) provides the glycidyl ether as an oil.

EXAMPLE 2
Preparation of $C_{9/11}$-alkyl Glycidyl Ether

Neodol® 91 (100.00 g, 0.632 mol Shell Chemical Co.) and tin (IV) chloride (0.82 g, 3.20 mmol available from Aldrich) are combined in a 500 mL three-necked, round-buttomed flask fitted with a condenser, argon inlet, addition funnel, mechanical stirrer and internal temperature probe. The mixture is heated to 65° C. Epichlorohydrin (58.46 g, 0.632 mol available from Aldrich) is added dropwise so as to keep the temperature between 60–65° C. After stirring an additional hour at 60° C., the mixture is cooled to room temperature and is treated with a 50% solution of sodium hydroxide (61.80 g, 0.773 mol, 50%). After addition is completed the mixture is heated to 90° C. for 3.0 h, cooled, and treated with water to dissolve all of the white solids. The organic phase is dried over $MgSO_4$, filtered, and concentrated. Distillation of the product mixture at 100° C. (0.1 mm Hg) provides the glycidyl ether as an oil.

EXAMPLE 3
Preparation of $C_{12/14}$-alkyl Glycidyl Ether

The procedure of Example 1 is repeated with the substitution of C 12/14 fatty alcohol for Neodol® 23.

EXAMPLE 4
Preparation of $C_{14/15}$-alkyl Glycidyl Ether

The procedure of Example 1 is repeated with the substitution of Neodol® 45 for Neodol® 23.

EXAMPLE 5
Preparation of $C_{14/15}$-alkyl Glycidyl Ether

The procedure of Example 1 is repeated with the substitution of Tergitol® 15-S-15 for Neodol® 23.

EXAMPLE 6
Preparation of $C_{12/14}$-alkyl-$C_{9/11}$ Alkyl Ethoxylated Ether Capped Alcohol Surfactant Neodol® 91-8 (16.60 g, 0.0325 mol Shell Chemical Co.) is placed in to a 250 ml three necked round bottom flask fitted with a condenser, argon inlet, addition funnel, magnetic stirrer and internal temperature probe. The contents of the flask are dried under vacuum at 75° C. for 15 minutes after establishing an Argon atmosphere, Tin (IV) Chloride (0.25 ml, 2.1 mmol Aldrich) is added to the flask via syringe. The mixture is heated to 60° C. at which point $C_{12/14}$-alkyl glycidyl ether (10.00 g, 0.039 mol) is added dropwise over 15 min while maintaining a temperature of 75–80° C. After stirring for 18 h at 60° C. The mixture stirs for an additional hour at 75° C. until the glycidyl ether is consumed, as determined by TLC. The mixture is cooled to room temperature and diluted with 1 ml of water. The solution is passed through a 170 g of silica gel (Aldrich 227196, 7×12 diameter) while eluting with 5% Methanol (40 ml) dichloromethane. The filtrate is concentrated by rotary evaporation and then stripped in a Kugelrohr oven (70° C., 0.1 mm Hg for 30 minutes) to yield product as an oil.

EXAMPLE 7
Preparation of $C_{12/14}$-alkyl-$C_{11/15}$-alkyl Ethoxylated Ether Capped Alcohol Surfactant Tergitol® 15-S-15 (2820.0 g, 3.275 mol Union Carbide) is melted in to a 12 L three necked round bottom flask fitted with a condenser, argon inlet, addition funnel, mechanical stirrer and internal thermometer. The contents of the flask are dried at 75° C. for 30 minutes under vacuum. An argon atmosphere is established. Tin (IV) Chloride (25 ml, 0.214 mmol Aldrich) is added to the flask via syringe. The mixture is heated to 85° C. $C_{12/14}$-alkyl glycidyl ether (1679.48 g, 6.549 mol) is added dropwise over 1 hour, maintaining the reaction temperature. After stirring for an additional 15 minutes at 75° C., the reaction is quenched with the addition of water (75 ml). The reaction is diluted with 500 ml of 5% methanol dichloromethane. The mixture is cooled to room temperature and then stripped in a Kugelrohr oven (70° C., 0.1 mm Hg for 30 minutes) to yield the surfactant as an oil.

From the aforementioned surfactants, a cleaning composition, and in particular, a dish or hard surface cleaning composition may be designed. The compositions can optionally include one or more other detergent adjunct materials or other materials for assisting or enhancing cleaning performance, treatment of the substrate to be cleaned, or to modify the aesthetics of the detergent composition (e.g., perfumes, colorants, dyes, etc.). The following are illustrative examples of such adjunct materials.

Detersive ingredients or adjuncts optionally included in the instant compositions can include one or more materials for assisting or enhancing cleaning performance, treatment of the substrate to be cleaned, or designed to improve the aesthetics of the compositions. Adjuncts which can also be included in compositions of the present invention, at their conventional art-established levels for use (generally, adjunct materials comprise, in total, from about 30% to about 99.9%, preferably from about 70% to about 95%, by weight of the compositions), include other active ingredients such as phosphate and non-phosphate builders, chelants, enzymes, dispersant polymers (e.g., from BASF Corp. or Rohm & Haas), color speckles, silvercare, anti-tarnish and/or anti-corrosion agents, silicates, dyes, fillers, germicides, alkalinity sources, hydrotropes, anti-oxidants, enzyme stabilizing agents, perfumes, solubilizing agents, carriers, processing aids, pigments, and pH control agents.

Depending on whether a greater or lesser degree of compactness is required, filler materials can also be present in the instant compositions. These include sucrose, sucrose esters, sodium sulfate, potassium sulfate, etc., in amounts up to about 70%, preferably from 0% to about 40% of the composition. Preferred filler is sodium sulfate, especially in good grades having at most low levels of trace impurities.

Sodium sulfate used herein preferably has a purity sufficient to ensure it is non-reactive with bleach; it may also be treated with low levels of sequestrants, such as phosphonates or EDDS in magnesium-salt form. Note that preferences, in terms of purity sufficient to avoid decomposing bleach, applies also to pH-adjusting component ingredients, specifically including any silicates used herein.

The compositions of the invention can optionally contain an alkyl phosphate ester suds suppressor, a silicone suds suppressor, or combinations thereof Levels in general are from 0% to about 10%, preferably, from about 0.001% to about 5%. However, generally (for cost considerations and/or deposition) preferred compositions herein do not comprise suds suppressors, that is they are totally free of them, or comprise suds suppressors only at low levels, e.g., less than about 0.1% of active suds suppressing agent.

Hydrotrope materials such as sodium benzene sulfonate, sodium toluene sulfonate, sodium cumene sulfonate, etc., can be present, e.g., for better dispersing surfactant.

Bleach-stable perfumes (stable as to odor); and bleach-stable dyes such as those disclosed in U.S. Pat. No. 4,714,562, Roselle et al, issued Dec. 22, 1987 can also be added to the present compositions in appropriate amounts.

Since the compositions can contain water-sensitive ingredients or ingredients which can co-react when brought together in an aqueous environment, it is desirable to keep the free moisture content at a minimum, e.g., 7% or less, preferably 5% or less of the compositions; and to provide packaging which is substantially impermeable to water and carbon dioxide. Coating measures may be employed to protect the ingredients from each other and from air and moisture. Plastic bottles, including refillable or recyclable types, as well as conventional barrier cartons or boxes are another helpful means of assuring maximum shelf-storage stability. As noted, when ingredients are not highly compatible, it may further be desirable to coat at least one such ingredient with a low-foaming nonionic surfactant for protection. There are numerous waxy materials which can readily be used to form suitable coated particles of any such otherwise incompatible components; however, the formulator prefers those materials which do not have a marked tendency to deposit or form films on dishes including those of plastic construction.

The following nonlimiting examples further illustrate compositions of the present invention.

EXAMPLE 8

An automatic dishwashing detergent composition is prepared as follows:

| Ingredients: | Weight % A | B |
|---|---|---|
| Sodium Tripolyphosphate (STPP) | 24.0 | 45 |
| Sodium carbonate | 20.0 | 13.5 |
| Hydrated 2.0r silicate | 15 | 13.5 |
| nonionic surfactants[1] | 2.0 | 2.0 |
| Tergitol 15S9 Nonionic surfactant[2] | 1.0 | 1.0 |
| Polymer[3] | 4.0 | — |
| Protease (4% active) | 0.83 | 0.83 |
| Amylase (0.8% active) | 0.5 | 0.5 |
| Perborate monohydrate (15.5% Active AvO)[4] | 14.5 | 14.5 |
| Cobalt catalyst[5] | 0.008 | — |
| Water, sodium sulfate and misc. | Balance | Balance |

[1]Ether-capped poly(oxyalkylated) alcohol of EXAMPLE 6
[2]Ethoxylated secondary alcohol supplied by Union Carbide (cloud point = 60° C.).
[3]Terpolymer selected from either 60% acrylic acid/20% maleic acid/20% ethyl acrylate, or 70% acrylic acid/10% maleic acid/20% ethyl acrylate.
[4]The AvO level of the above formula is 2.2%.
[5]Pentaammineacetatocobalt(III) nitrate.

The ADD's of the above dishwashing detergent composition examples may be used to wash lipstick-stained plastic and ceramic, tea-stained cups, starch-soiled and spaghetti-soiled dishes, milk-soiled glasses, starch, cheese, egg or babyfood-soiled flatware, and tomato-stained plastic spatulas by loading the soiled dishes in a domestic automatic dishwashing appliance and washing using either cold fill, 60° C. peak, or uniformly 45–50° C. wash cycles with a product concentration of the exemplary compositions of from about 1,000 to about 10,000 ppm, with excellent results.

The following examples further illustrate phosphate built ADD compositions which contain a bleach/enzyme particle, but are not intended to be limiting thereof All percentages noted are by weight of the finished compositions, other than the perborate (monohydrate) component, which is listed as AvO.

EXAMPLES 9–10

| | 9 | 10 |
|---|---|---|
| Catalyst[1] | 0.008 | 0.004 |
| Savinase ™ 12T | — | 1.1 |
| Protease D | 0.9 | — |
| Duramyl ™ | 1.5 | 0.75 |
| STPP | 31.0 | 30.0 |
| Na$_2$CO$_3$ | 20.0 | 30.5 |
| Polymer[2] | 4.0 | — |
| Perborate (AvO) | 2.2 | 0.7 |
| Dibenzoyl Peroxide | 0.2 | 0.15 |
| 2 R Silicate (SiO$_2$) | 8.0 | 3.5 |
| Paraffin | 0.5 | 0.5 |
| Benzotriazole | 0.3 | 0.15 |
| nonionic surfactant[3] | 1.0 | 1.0 |
| Sodium Sulfate, Moisture | ---------Balance--------- | |

[1]Pentaammineacetatocobalt (III) nitrate; may be replace by MnTACN.
[2]Polyacrylate or Acusol 480N or polyacrylate/polymethacrylate copolymers.
[3]A nonionic surfactant prepared according to EXAMPLE 6.

In Compositions of Examples 9 and 10, respectively, the catalyst and enzymes are introduced into the compositions as 200–2400 micron composite particles which are prepared by spray coating, fluidized bed granulation, marumarizing, prilling or flaking/grinding operations. If desired, the protease and amylase enzymes may be separately formed into their respective catalyst/enzyme composite particles, for reasons of stability, and these separate composites added to the compositions.

EXAMPLES 11 and 12

Granular dishwashing detergents are as follows:

| | 11 | 12 |
|---|---|---|
| Composite Particle | 1.5 | 0.75 |
| Savinase ™ 12T | 2.2 | — |
| Protease D | — | 0.45 |
| STPP | 34.5 | 30.0 |
| Na$_2$CO$_3$ | 20.0 | 30.5 |
| Acusol 480N | 4.0 | — |
| Perborate (AvO) | 2.2 | 0.7 |
| 2 R Silicate (SiO$_2$) | 8.0 | 3.5 |
| Paraffin | — | 0.5 |
| Benzotriazole | — | 0.15 |
| nonionic surfactant[1] | 1.0 | 1.0 |

-continued

|  | 11 | 12 |
|---|---|---|
| LF404[2] | 1.0 | 0.75 |
| Sodium Sulfate, Moisture | ---to balance--- | |

[1]Prepared according to EXAMPLE 6.
[2]A blend of ethoxylated/propoxylated nonionic surfactants available from BASF.

EXAMPLE 13

Light-duty liquid dishwashing detergent formulae are prepared as follows:

| | Composition % Weight | | |
|---|---|---|---|
| Ingredient | A | B | C |
| Surfactant[1] | 1.00 | 2.00 | 1.50 |
| AES | 32.00 | 33.00 | 29.00 |
| Amine Oxide Surfactant | 5.00 | 4.50 | 6.00 |
| Betaine Surfactant | 3.00 | 5.00 | 1.75 |
| Perfume | 0.18 | 0.18 | 0.18 |
| Water and minors | ---Balance--- | | |

[1]Prepared according to EXAMPLE 6

EXAMPLE 14

An automatic dishwashing detergent tablet is prepared from the composition as follows:

| | Weight % | |
|---|---|---|
| Ingredients: | A | B |
| Sodium Tripolyphosphate (STPP) | 50.0 | 47.0 |
| Sodium carbonate | 14.0 | 15 |
| Hydrated 2.0r silicate | 8.0 | 5.0 |
| nonionic surfactant[1] | 0.4 | 2.0 |
| Tergitol 15S9 Nonionic surfactant[2] | 1.0 | 1.0 |
| Polymer[3] | 4.0 | — |
| Protease (4% active) | 2.0 | 1.50 |
| Amylase (0.8% active) | — | 0.5 |
| Perborate monohydrate (15.5% Active AvO)[4] | 1.5 | 1.5 |
| Cobalt catalyst[5] | 0.008 | — |
| TAED | — | 2.2 |
| Benzotriazole | 0.3 | — |
| Paraffin Oil[6] | 0.5 | — |
| Water, sodium sulfate and misc. | Balance | Balance |

[1]Ether-capped poly(oxyalkylated) alcohol of EXAMPLE 6
[2]Ethoxylated secondary alcohol supplied by Union Carbide (cloud point = 60° C.).
[3]Polyacrylate polymer blended with HEDP.
[4]The AvO level of the above formula is 2.2%.
[5]Pentaammineacetatocobalt(III) nitrate.
[6]Winog 70 available from Wintershall, Salzbergen, Germany.

The ADD's of the above dishwashing detergent composition examples may be used to wash lipstick-stained plastic and ceramic, tea-stained cups, starch-soiled and spaghetti-soiled dishes, milk-soiled glasses, starch, cheese, egg or babyfood-soiled flatware, and tomato-stained plastic spatulas by loading the soiled dishes in a domestic automatic dishwashing appliance and washing using either cold fill, 60° C. peak, or uniformly 45–50° C. wash cycles with a product concentration of the exemplary compositions of from about 1,000 to about 10,000 ppm, with excellent results.

EXAMPLE 15

A hard surface cleaning composition according to the present invention is illustrated as follows:

| | Weight % | | | | | |
|---|---|---|---|---|---|---|
| Ingredients | 18 | 19 | 20 | 21 | 22 | 23 |
| Surfactant[1] | 0.25 | 3.5 | 5.5 | 6.5 | 6.1 | 9.5 |
| Sodium hypochlorite | 0.9 | 1.4 | 1.4 | — | — | — |
| Calcium hypochlorite | — | — | — | 0.5 | — | — |
| Sodium dichlorocyanurate | — | — | — | — | 1.2 | 2.0 |
| Tetrapotassium pyrophos. | 6.0 | — | — | — | 13.0 | — |
| Tripotassium phosphate | 2.0 | — | — | — | 12.0 | — |
| Sodium tripolyphosphate | — | — | — | 1.6 | — | — |
| Calcium carbonate | — | — | — | — | 39.0 | 1.1 |
| Calcium oxide | — | — | — | — | 2.8 | — |
| Perlite abrasive | 6.5 | — | — | — | 22.5 | 0.5 |
| Sodium hydroxide | 0.8 | 1.6 | 1.8 | 0.8 | 1.1 | 1.0 |
| Potassium hydroxide | — | — | — | 0.85 | — | — |
| Dyes | 0.75 | 0.28 | 0.28 | 0.28 | — | — |
| Lanolin | — | — | — | — | — | 2.1 |
| Carboxymethylcellulose | — | — | — | — | — | 2.6 |
| Water/Misc. | bal. | bal. | bal. | bal. | bal. | bal. |

[1]Ether-capped poly(oxyalkylated) alcohol of EXAMPLE 6.

EXAMPLE 16

Liquid gel-like automatic dishwashing detergent compositions according to the present invention as prepared as followed:

| STPP builder | 17.5 | 16 |
|---|---|---|
| K carbonate | 8 | — |
| Na carbonate | — | 1.5 |
| K hydroxide | 2 | 2.0 |
| K silicate | 4 | 1.5 |
| Na silicate | 2 | 3 |
| thickener | 1 | 1 |
| Nitric acid | 0.02 | 0.02 |
| Al tristearate | 0.1 | — |
| polymer dispersant[2] | 0.5 | — |
| Na benzoate | 0.8 | 0.5 |
| Surfactant[1] | 1.0 | 2.0 |
| Perborate | — | 2.2 |
| Na hypochlorite | 1.5 | — |
| Water and Minors | balance | balance |

[1]Ether-capped poly(oxyalkylated) alcohol of EXAMPLE 6
[2]sodium polyacrylate of 4500 m.w.

What is claimed is:
1. A process for preparing an ether-capped poly (oxyalkylated) alcohol having the formula:

wherein $R^1$ is a linear or branched, saturated or unsaturated, aliphatic or aromatic hydrocarbon radical having from 1 to 30 carbon atoms; $R^2$ is a linear or branched, saturated or unsaturated, aliphatic or aromatic hydrocarbon radical having from 6 to 30 carbon atoms; $R^3$ is H, or a linear aliphatic hydrocarbon radical having from 1 to 4 carbon atoms; x is an integer having an average value from 1 to 30, wherein when x is 2 or greater $R^3$ may be the same or different and k and j are integers having an average value of from 1 to 12; further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof, comprising the steps of:

(a) providing a glycidyl ether having the formula:

$$R^2O\text{—CH}_2\text{—CH(—O—)CH}_2$$

wherein $R^2$ is defined as above;

(b) providing an ethoxylated alcohol having the formula:

$$R^1\text{—O—(CH}_2\text{CH(R}^3\text{)O)}_x\text{H}$$

wherein $R^1$, $R^3$ and x are defined as above; and (c) reacting the glycidyl ether with the ethoxylated alcohol to form the surfactant.

2. A process according to claim 1 wherein $R^1$ and $R^2$ are each independently a $C_6$–$C_{22}$ linear or branched, saturated for unsaturated, aliphatic hydrocarbon radical.

3. A process according to claim 1 wherein the index x is from about 6 to about 15.

4. A process according to claim 1 wherein said glycidyl ether is reacted with said ethoxylated alcohol in the presence of a catalyst.

5. A process according to claim 4 wherein said catalyst is an acid catalyst.

6. A process according to claim 4 wherein said catalyst is selected from the group consisting of titanium tetrachloride, titanium tetraisopropoxide, zinc tetrachloride, stannic chloride, aluminum chloride, boron trifluoride etherate, and mixtures thereof.

7. A process according to claim 6 wherein said catalyst is stannic chloride.

8. A process according to claim 1 wherein said glycidyl ether is reacted with said ethoxylated alcohol at a temperature of from about 50° C. to about 95° C.

9. A process according to claim 8 wherein said glycidyl ether is reacted with said ethoxylated alcohol at a temperature of from about 60° C. to about 80° C.

10. A process according to claim 1 further comprising the step of reacting an alcohol having the formula $R^2OH$ wherein $R^2$ is a $C_6$–$C_{30}$ linear or branched, saturated or unsaturated, aliphatic or aromatic hydrocarbon radical; with an epoxide having the formula:

$$X\text{—CH}_2\text{—CH(—O—)CH}_2$$

to form said glycidyl ether.

11. A process according to claim 10 wherein said step is conducted in the presence of a catalyst.

12. A process according to claim 11 wherein said catalyst is an acid catalyst.

13. A process according to claim 12 wherein said catalyst is selected from the group consisting of titanium tetrachloride, titanium tetraisopropoxide, zinc tetrachloride, stannic chloride, aluminum chloride, boron trifluoride etherate, and mixtures thereof.

14. A process according to claim 13 wherein said catalyst is stannic chloride.

15. A process according to claim 10 wherein said catalyst is present in an amount of from about 0.1 mol % to about 2 mol %.

16. A process according to claim 10 wherein said step is conducted in the presence of a solvent.

17. A process according to claim 10 wherein said step is conducted at a temperature of from about 40° C. to about 90° C.

18. A process for preparing an ether-capped poly (oxyalkylated) alcohol surfactant having the formula:

$$R^1O[CH_2CH(R^3)O]_kCH_2CH(OH)CH_2OR^2$$

wherein $R^1$ is a linear or branched, saturated or unsaturated, aliphatic or aromatic hydrocarbon radical having from 1 to about 30 carbon atoms; $R^2$ is a linear or branched, saturated or unsaturated, aliphatic or aromatic hydrocarbon radical having from 6 to about 30 carbon atoms; $R^3$ is H, or a linear aliphatic hydrocarbon radical having from 1 to 4 carbon atoms; x is an integer having an average value from 1 to 30, wherein when x is 2 or greater $R^3$ may be the same or different and k and j are integers having an average value of from 1 to 12; further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof; comprising the steps of:

(a) forming a glycidyl ether having the formula:

$$R^2O\text{—CH}_2\text{—CH(—O—)CH}_2$$

wherein $R^2$ is defined as above by reacting a linear aliphatic or aromatic alcohol having the formula $R^2OH$ and an epoxide having the formula:

$$X\text{—CH}_2\text{—CH(—O—)CH}_2$$

wherein $R^2$ is defined as above and X is a leaving group;

(b) providing an ethoxylated alcohol having the formula:

$$R^1\text{—O—(CH}_2\text{CH(R}^3\text{)O)}_x\text{H}$$

wherein $R^1$, $R^3$ and x are defined as above; and (c) reacting said glycidyl ether with said ethoxylated alcohol to form said surfactant.

19. A process according to claim 18 wherein said catalyst is selected from the group consisting of titanium tetrachloride, titanium tetraisopropoxide, zinc tetrachloride, stannic chloride, aluminum chloride, boron trifluoride etherate, and mixtures thereof.

20. A process according to claim 18 wherein said glycidyl ether is reacted with said ethoxylated alcohol at a temperature of from about 50° C. to about 95° C.

* * * * *

UNITED STATES PATENT AND TRADEMARK OFFICE
CERTIFICATE OF CORRECTION

PATENT NO. : 6,365,785 B1
DATED : April 2, 2002
INVENTOR(S) : Mark Robert Sivik

It is certified that error appears in the above-identified patent and that said Letters Patent is hereby corrected as shown below:

<u>Title page,</u>
Item [56], References Cited, PATENT APPLICATION DOCUMENTS, should include
-- PCT/US99/25944
PCT/US00/03456
PCT/US00/03455
PCT/US00/04185
PCT/US00/03454
PCT/US99/25943 --

Item [56], References Cited, U.S. PATENT DOCUMENTS, should include
-- 4,248,729
4,272,394
4,284,532
4,627,927
4,770,815
4,790,856
4,804,492
4,978,805
5,035,814
5,047,165
5,419,853
5,576,281
5,616,277
5,766,371 --

Item [56], References Cited, FOREIGN PATENT DOCUMENTS, should include
-- EP 0 342 177 B1
GB 2,144,763
GB 2,154,599
WO 92/06150
WO98/11185
WO99/06466
WO99/06467 --

UNITED STATES PATENT AND TRADEMARK OFFICE
CERTIFICATE OF CORRECTION

PATENT NO. : 6,365,785 B1
DATED : April 2, 2002
INVENTOR(S) : Mark Robert Sivik

It is certified that error appears in the above-identified patent and that said Letters Patent is hereby corrected as shown below:

Item [56], References Cited, OTHER REFERENCES, should include
-- Brian D. Condon, *Glyceryl Bisether Sulfates 1: Improved Synthesis*, Journal of the American Chemical Society, Vol. 71, No. 7 (July 1994) --

Column 12,
Line 51, should read -- (oxyalkylated) alcohol surfactant having the formula: --.
Lines 61 and 62, should read -- . . . . .different; further wherein when x is 15 .... --.

Column 13,
Line 20, should read -- alcohol at a temperature of from about 50°C to about 95°C in the presence of an acid catalyst to form the surfactant --.

Column 14,
Lines 20 and 21, should read -- different; further wherein when x is 15 ..... --.
Line 57, should read -- alcohol at a temperature of from about 50ºC to about 95ºC in the presence of an acid catalyst to form the surfactant --.

Signed and Sealed this

Twelfth Day of November, 2002

Attest:

Attesting Officer

JAMES E. ROGAN
*Director of the United States Patent and Trademark Office*